ANGULAR MODULATION DEVICE

Filed May 19, 1953 2 Sheets-Sheet 1

INVENTOR
EDUARD HERMAN HUGENHOLTZ.
BY Fred M Vogel
AGENT

ANGULAR MODULATION DEVICE

Filed May 19, 1953 2 Sheets-Sheet 2

INVENTOR
EDUARD HERMAN HUGENHOLTZ
BY Fred M Vogel
AGENT 2,697,815
Patented Dec. 21, 1954

2,697,815

ANGULAR MODULATION DEVICE

Eduard Herman Hugenholtz, Hilversum, Netherlands, assignor to Hartford National Bank and Trust Company, Hartford, Conn., as trustee Application May 19, 1953, Serial No. 356,044

4 Claims. (Cl. 332—19)

This invention relates to devices comprising an oscillator provided with means, controlled by a control-voltage, for automatic frequency correction and angular modulation of the oscillator voltage.

My copending U. S. patent application Serial No. 149,692, filed March 15, 1950, relates to a device comprising a high-frequency oscillator provided with a frequency corrector, controlled by a control-voltage, for automatic frequency stabilisation and phase stabilisation of the oscillator voltage relative to a higher harmonic of the frequency of a governing voltage, the control-voltage being produced by means of a cathode-ray tube, in which the electron beam is deflected by means of deflection members under the action of a governing-voltage source included in the deflection circuit, in a manner such relatively to a collecting electrode that pulses occur at the collecting electrode in a rhythm determined by the governing voltage. The electron beam is, moreover, controlled by the voltage of the high-frequency oscillator in a manner such that at the collecting electrode pulses occur, the duration or the amplitude of which varies with the phase relationship between the oscillator voltage and the governing voltage. The control-voltage required for AFC-purposes is derived through an integrating network and a low bandpass filter from the pulses occurring at the collecting electrode. In such devices, comprising an oscillator synchronized by pulses, referred to as IGO, the cathode-ray tube fulfils a double function, i. e. firstly that of a pulse producer and secondly that of a phase detector.

The applicant has found that in devices according to the aforesaid patent application, as far as the intensity of the electron beam is modulated by the voltage from the high-frequency oscillator and hence the collecting electrode has produced at it pulses of constant duration, the amplitude of which is modulated in accordance with the phase relationship between the oscillator voltage and the governing voltage, an angular modulation of the high-frequency-oscillator voltage which fulfils high requirements for linearity may be obtained in a particularly simple and efficient manner. In accordance with the present invention a modulation-voltage source is included in series with the governing-voltage source in the deflection circuit in order to obtain angular modulation of the oscillator voltage in accordance with a modulating voltage supplied by the modulation voltage source and the electron beam is, moreover, controlled in accordance with the governing voltage in a manner such that it strikes the collecting electrode only once in one period of the governing voltage, the control-voltage circuit comprising the integrating network whilst the low bandpass filter allowing the modulation frequencies to pass uniformly.

The cathode-ray tube now has a third function: the pulses of constant duration occurring at the collecting electrode of the cathode-ray tube are not only amplitude-modulated in accordance with the phase relationship between the oscillator voltage and the governing voltage, but also position-modulated in accordance with the modulating voltage. The control-voltage obtained by integrating the pulses now exhibits two kinds of amplitude variations, since in one period of the governing voltage only one pulse occurs at the collecting electrode, one variation corresponding to the phase relationship between the oscillator voltage and the governing voltage and another variation corresponding to the modulating voltage; it is found that in the device concerned these kinds of amplitude variations do not interfere with one another, although sometimes they cannot be distinguished either in amplitude or in frequency. Under the action of the control-voltage supplied to the frequency corrector the voltage from the high-frequency oscillator follows as to mean frequency and frequency sweep the stabilizing higher harmonic of the governing voltage, which is known per se in the use of IGO arrangements for frequency-modulation purposes. Both the central frequency of the voltage from the high-frequency oscillator and its frequency sweep are multiplied, compared with the fundamental frequency of the pulses at the collection electrode and their angular modulation, by a factor equal to the ratio between the stabilizing harmonic frequency and the fundamental frequency. This factor may without any objection, be materially higher than 10; it may, for example, lie between 20 and 100.

If the invention is carried out in a device, in which a frequency difference between the frequency of the high-frequency oscillator and a harmonic of the governing-voltage frequency, this difference corresponding to a medium frequency, is maintained, the integrating network included in the control-voltage cascade is preferably constituted by a bandpass filter, included in the collecting-electrode circuit of the cathode-ray tube and tuned to the medium frequency, the bandwidth of this filter corresponding to double the frequency range of the modulating voltage, whilst the output voltage of the bandpass filter and an auxiliary oscillator producing the desired medium frequency control a mixing stage operating as a phase detector, the output circuit of which comprises a low bandpass filter allowing mixed direct voltages and modulation frequencies to pass; the output voltage of this filter controls the frequency corrector of the high-frequency oscillator.

In order that the invention may be readily carried into effect, it will now be described in detail with reference to the accompanying drawing.

Figure 1:
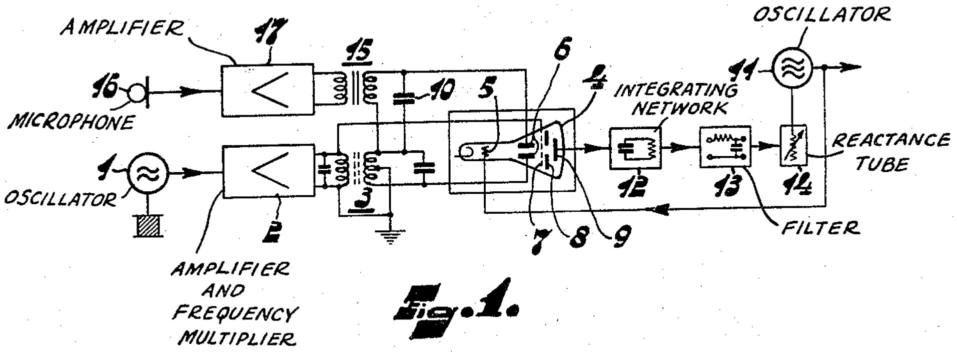
Fig. 1 shows mainly a block diagram of a device according to the invention, in which the central frequency of the high-frequency oscillator is equal to a higher harmonic of the governing voltage.

Referring to Fig. 1, reference numeral 1 designates a crystal-controlled oscillator for producing a sinusoidal voltage of, for example 100 kc./s. An amplifying and frequency-multiplying circuit 2, connected to this oscillator, supplies a governing sine voltage of 1 mc./s. to a tuned output transformer 3. The secondary winding of the transformer is provided with a central tapping, connected to earth; the governing voltage $V_s$, occurring across the winding, is indicated in Fig. 2a.

The device shown in Fig. 1 comprises, moreover, a cathode-ray tube 4, shown diagrammatically, in which an electron beam passes in succession an intensity-controlling grid 5, a pair of plates 6 for vertical deflection, a second intensity-controlling grid 7 and a mask electrode 8, having a horizontal slit-shaped aperture, after which the beam strikes a collecting electrode 9. The deflection plates 6 are connected in push-pull to the secondary winding of the output transformer 3; the lower plate of the pair 6 is connected directly to one end of the transformer winding and the upper plate is connected via a coupling capacitor 10 to the other end of the output winding. The governing voltage of 1 mc./s. thus supplied to the deflection plates produces a deflection of the electron beam in a vertical direction, so that it could pass through the horizontal slit in the mask electrode 8 and strike the collecting electrode 9 twice in one period of the governing voltage, i. e. at the instants of zero passages of the governing voltage $V_s$ in Fig. 2a. Across the primary circuit of the output transformer 3 occurs a voltage having a phase displacement of 90° relative to the deflection voltage and supplied to the control-grid 7 and suppressing the electron beam during its negative half waves. Thus the electron beam is cut off during each second zero passage of the governing voltage $V_s$ by the grid 7 and a pulse occurs at the collecting electrode 9 only once in one period of the governing voltage i. e. during the positive zero passages of $V_s$, indicated by circles in Fig. 2*a*. The recurrence frequency of the pulse occurring at the collecting electrode is, consequently 1 mc./s.; the duration of the pulses may be, for example, 0.1 µsec.

The output voltage of a high-frequency oscillator 11 to be stabilized on a high harmonic of the pulse recurrence-frequency, for example, on 44 mc./s., is supplied to the intensity-controlling grid 5 of the cathode-ray tube and thus produces an amplitude modulation of the pulses occurring at the collecting electrode 9, varying with the phase relationship between the oscillator voltage and the stabilizing harmonic of the pulses, the phase of which is determined by the 1 mc./s. governing voltage. Subsequent to integration (for amplitude detection purposes) by means of an integrating network 12 and subsequent to smoothing by means of a low bandpass filter 13, the amplitude-modulated pulses supply an A. F. C.-voltage suitable for controlling a reactance tube 14, coupled with the high-frequency oscillator, in order to stabilize the frequency of the high-frequency oscillator 11.

An angular modulation of the oscillator voltage, the frequency of which is stabilized by the governing voltage, is obtained as follows.

The circuit of the deflection plates 6 comprises not only the output transformer 3 of the governing-voltage source, but also an output transformer 15, connected in series herewith and associated with a microphone amplifier 17, connected to a microphone 16. The modulation voltage, indicated in Fig. 2*a* by $V_m$ occurs across the secondary winding of the transformer 15, included in the deflection circuit and shunted by a capacitor 10 for the 1 mc./s. governing voltage. The frequency spectrum of the modulation voltage varies, of course, with the use which is to be made thereof: in the case of the transmission of speech only it extends for example from 200 to 3400 c./s.; for the transmission of music, for example, from 20 to 9000 c./s.; and for the transmission of a plurality of speech channels and/or music channels in a frequency multiplex system, for example, from 0 to 48 kc./s. In every case the governing-voltage frequency must be materially higher than the highest modulation frequency, preferably at least ten times this frequency.

Figure 2:
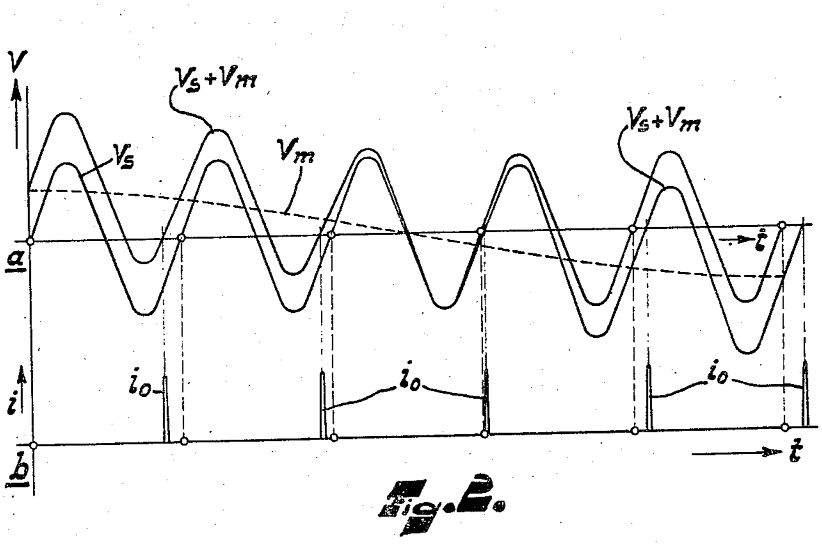
Figs. 2a and 2b show time diagrams of the deflection voltages operating across the deflection circuit of the cathode-ray tube and of the current pulses occurring at the collecting electrode as a result thereof.

The total deflection voltage occurring at the deflection plates is the sum of the governing voltage and of the modulation voltage, as is indicated in Fig. 2*a* by $V_s+V_m$, since these voltages occur in series across the deflection circuit. As in the former case, only during the positive zero passage of the deflection voltage a current pulse occurs at the collecting electrode 9 of the cathode-ray tube. The instant of these zero passages and hence the position of the $i_0$ in Fig. 2*b* at the collecting electrode has now varied compared with the instants indicated by a circle in Fig. 2; the pulses $i_0$ obtained are modulated in position by the modulation voltage. The higher harmonics of the pulse recurrence-frequency exhibit a phase variation which increases in proportion with the numeral order of the harmonic and which may be interpreted as a frequency sweep, if the modulation-voltage cascade comprises an integrating network in order to obtain frequency modulation instead of phase modulation. By integrating the pulses $i_0$ of Fig. 2*b* by means of a network, the simplest form of which is constituted by the parallel combination of a capacitor and a resistor, (cf. 12 in Fig. 1) and by smoothing the voltage produced across the integrating network a control-voltage is obtained, which varies with the phase relationship between the voltage from the main oscillator 11 and the governing voltage $V_s$. This control-voltage is suitable to cause the frequency and the phase of the high-frequency oscillator 11, by means of the frequency corrector 14, to follow a higher harmonic of the governing voltage, to be chosen at will by initial tuning of the oscillator 11.

The control-voltage produced across the integrating network contains, moreover, the modulating voltage, so that, if the whole frequency spectrum of the modulating voltage is allowed to pass uniformly and substantially without attenuation to the frequency corrector and if the latter is substantially free from inertia, for example, constructed in the form of an electronic frequency corrector, the instantaneous frequency of the high-frequency oscillator 11 follows accurately the instantaneous frequency of the stabilizing component of the pulse spectrum. It should be noted that the control-voltage produced across the integrating network would not contain the modulating voltage-effects of second order not being considered if at positive and negative zero passages of the deflection voltage a pulse would be produced at the collecting electrode.

From Fig. 2*a* it will be obvious that the angular modulation obtained fulfils high requirements for linearity, if the zero passages at the highest modulation-voltage amplitude still lie within that part of the governing sine-voltage curve which is to be considered as substantially linear, i. e. within about 15° of the bend of the sine curve. This is safeguarded, if the amplitude of the modulating voltage across the deflection circuit is not more than ¼ of the amplitude of the governing voltage. In spite of the comparatively small phase modulation which is thus permissible, the finally obtained frequency sweep of the voltage from the high-frequency oscillator is great owing to the high multiplication factors obtainable.

Figure 3:
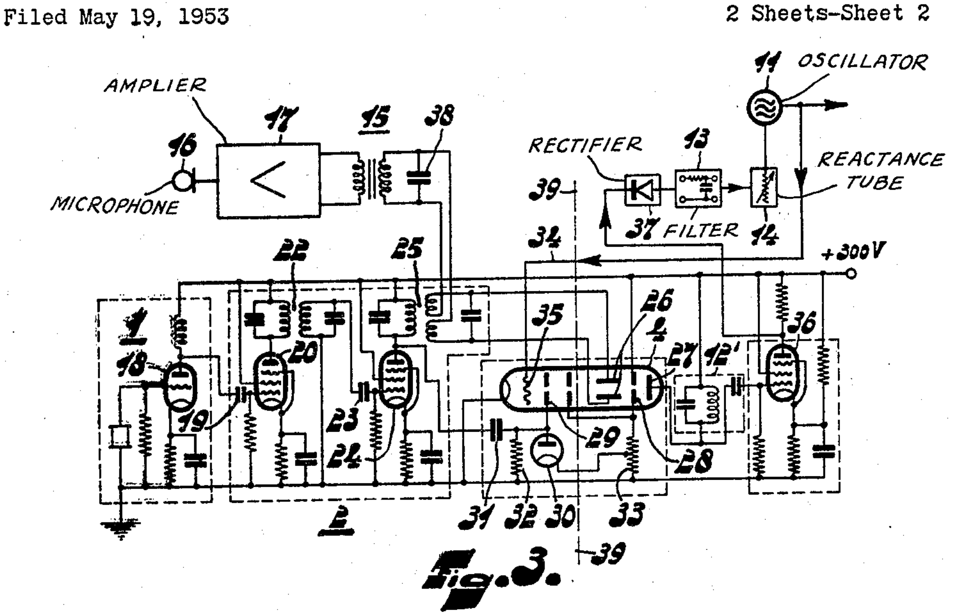
Fig. 3 shows mainly a detail circuit-diagram of a device according to the invention as shown in Fig. 1

Fig. 3 shows mainly a detail diagram of one embodiment of a device according to the invention. Parts corresponding to those shown in Fig. 1 are designated by the same reference numerals.

The device shown in Fig. 3 comprises a crystal-controlled oscillator 1, comprising a triode 18, from which a sine oscillation of 0.1 mc./s. is derived. The output voltage of this oscillator is supplied via a grid capacitor 19 to an amplifying and frequency-multiplying circuit 2. The latter comprises a frequency multiplying stage having a pentode 20, the anode circuit of which includes an output transformer 22, tuned to 0.5 mc./s. The sine oscillations obtained, having a frequency of 0.5 mc./s., are supplied via a grid capacitor 23 to a second frequency-multiplying stage having a pentode 24, the anode circuit of which includes an output transformer 25 tuned to 1 mc./s. The parts 18 to 25, described above, correspond with the parts 1 and 2 shown in Fig. 1.

The sine output voltage, having a frequency of 1 mc./s., must be converted into stabilizing pulses having a recurrence frequency of 1 mc./s. and be mixed, for phase detection, with the voltage of the oscillator 11, to be stabilized on a frequency of, for example, 44 mc./s. This is carried out in the cathode-ray tube 4, which serves as a pulse producer and a phase detector, and to which the output voltage of the oscillator 11 is supplied through the conductor 34.

The tube 4 is a cathode-ray tube, in which an electron beam is produced and deflected by means of the sine output voltage of 1 mc./s. of the pentode 24, supplied to the deflection plates 26 in push-pull and thus it strikes periodically a collecting electrode 27, which is arranged behind a slit in a mask electrode 28. Without taking special measures and apart from the modulating voltage, introduced into the deflection circuit and to be described hereinafter, the electron beam would strike the collecting electrode 27 during each zero passage of the deflection voltage of 1 mc./s., i. e. twice in one period. The pulse recurrence-frequency would then be 2 mc./s., which is not permissible in the present case. In order to avoid this, the electron beam is suppressed during the major part of each period of the deflection voltage with the use of an intensity controlling electrode 29, arranged between the deflection plates 26 and the cathode of the cathode-ray tube. To this intensity-controlling electrode 29 is supplied a voltage of 1 mc./s., derived from the primary of the output transformer 25, having a phase displacement of 90° relative to the deflection voltage, supplied to the deflection plates and derived from the secondary of the output transformer. The voltage is supplied to the intensity-controlling electrode 29 via a diode detector circuit, comprising a diode 30, a capacitor 31 and a parallel resistor 32. The cathode of the diode 30 is connected to a tapping of a potentiometer resistor 33 connected in parallel with the anode voltage source and thus the diode has a bias voltage of, for example, +40 v. at a deflection voltage of 60 to 70 v. The diode circuit operates as a biassed threshold circuit, so that the intensity-controlling electrode 29 is positive relative to the cathode of the cathode-ray tube only for part of the positive half waves of the voltage supplied to the diode circuit, which results in that the collecting electrode 27 is struck by the electron beam only once in one period of the deflection voltage, so that pulses having a recurrence frequency of 1 mc./s. occur at this collecting electrode.

Through the conductor 34 the output voltage of the local oscillator 11 to be stabilized (cf. Fig. 1) is supplied to an intensity-controlling electrode 35 of the cathode-ray tube, so that the pulses occurring at the collecting electrode 27, and having a recurrence frequency of 1 mc./s., are modulated in amplitude by this oscillator voltage. Thus the cathode-ray tube 4 serves not only as a pulse producer, but also as a pulse mixing stage to obtain phase detection. The amplitude-modulated pulses of 1 mc./s. occurring at the collecting electrode 27 are supplied to a circuit 12′, serving as an integrating network and tuned to 3 mc./s. It should be noted that the circuit 12′ may, as an alternative, be tuned to other harmonics of the pulse recurrence-frequency and even to the pulse recurrence-frequency. However, in the latter case parasitic couplings between the deflection circuit and the collecting-electrode circuit may give rise to interference. Across the circuit 12′ occurs a voltage, the amplitude of which varies in accordance with the amplitude modulation of the pulses. Subsequent to amplification by means of a pentode 36, this circuit voltage is rectified in a rectifier 37 and subsequent to smoothing by means of the low bandpass filter 13, the direct voltage obtained controls as a control-voltage a reactance tube circuit coupled with the high-frequency oscillator 11. Thus the oscillator, if it had initially been tuned to approximately 44 mc./s., is stabilized in frequency and phase by the control-circuit described above accurately on the 44th harmonic of the governing voltage of 1 mc./s.

If in the device described so far the phase of the governing voltage varies slowly, for example, by +10°, the phase of the 44th harmonic varies by 44×10°=440° and the oscillator 11 follows the latter phase variation. Non-linearities, for example, of tubes in the control-circuit between the cathode-ray tube 4 and the reactance tube 14 have substantially no detrimental effect, provided that the amplification factor in the said part of the control-circuit has not varied. In the case of a constant variation of the phase of the pulses occurring at the collecting electrode of the cathode-ray tube 4 in accordance with a modulating voltage, the modulation spectrum of the fundamental frequency of the pulsatory voltage must be taken into consideration after the collecting electrode 27 and it is desirable to provide that the whole modulation spectrum in the aforesaid part of the control-voltage circuit is allowed to pass uniformly. In general no difficulties arise in this case, since the required bandwidth is comparatively small and, moreover, if the modulation spectrum is not allowed to pass quite uniformly, this results only in that a phase displacement of the voltage from the oscillator 11 occurs relatively to the stabilizing harmonic component, the absolute value of which varies at the most only by a few degrees; these variations are comparatively negligible.

In the device shown in Fig. 3 the desired position modulation of the pulses at the collecting electrode 27 is obtained as follows.

The secondary winding of the output transformer 25 for the governing voltage is divided into two halves; these two halves are intercoupled for the governing-voltage frequency by the coupling capacitor 38. Between the said halves is, moreover, connected the secondary winding of an output transformer 15 of the microphone amplifier 17, connected to a microphone 16. This circuit supplies both the governing voltage and the modulating voltage in push-pull to the deflection plates 26 of the cathode-ray tube 4 and the modulating voltage, as is shown in Fig. 2, produces position modulation of the pulses occurring at the collecting electrode 27. The voltage of the high-frequency oscillator 11 now follows in frequency and in phase the frequency and the phase of, for example, the 44th harmonic of the pulses occurring at the collecting electrode.

Figure 3A:
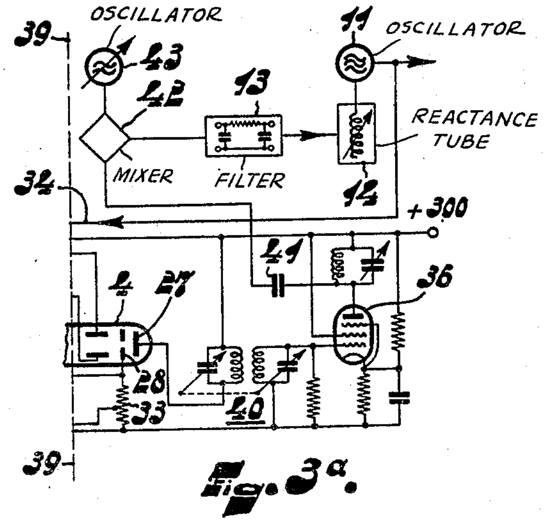
Fig. 3a shows a variant thereof, in which a frequency distance between the frequency of the high-frequency oscillator and the stabilizing harmonic frequency, corresponding to a medium frequency, is maintained.

Fig. 3*a*, in which the parts corresponding to those shown in Fig. 3 are designated by the same reference numerals, shows a variant of the circuit portion on the right-hand side of the broken line 39 of Fig. 3; this part is intended to maintain a frequency difference between the central frequency of the high-frequency oscillator 11 and the stabilizing spectrum component, this difference being equal to a medium frequency. The frequency difference to be maintained may be chosen at will within between very wide limits and be variable; the medium-frequency oscillations are frequency or phase modulated and must be separable in frequency from the pulse recurrence-frequency and harmonics thereof.

The medium frequency may, for example, be variable from 200 to 400 kc./s. in steps of 20 kc./s., or, for example, be 1.2, 1.3 mc./s. and so on.

If the desired frequency of the oscillations is, for example, 42.3 mc./s. in the case of stabilisation on the 41st harmonic of the pulses of 1 mc./s., a medium frequency of 1.3 mc./s. is used and the circuit of the collecting electrode 27 includes a bandpass filter 40, tuned to 1.3 mc./s., the bandwidth of which is sufficient to allow a carrier oscillation of 1.3 mc./s., modulated by the modulation voltage, to pass uniformly. The medium-frequency oscillation of 1.3 mc./s. selected by this bandpass filter is supplied, subsequent to amplification by the pentode 36, through the coupling capacitor 41, to a mixing stage 42, operating as a phase detector, in order to mix it in a stable auxiliary oscillator 43, supplying the desired medium frequency of 1.3 mc./s. The output voltage of the mixing stage 42 supplies the control-voltage required for stabilisation and controls the reactance tube circuit 14, subsequent to smoothing in the filter 13 which allows direct voltages and modulation frequencies to pass (cf. Fig. 3). The high-frequency oscillator 11 is now stabilized in frequency and angular modulation on 42.3 mc./s. relatively to the 41st harmonic of the pulse recurrence-frequency.

By varying the tuning of the auxiliary oscillator 43 and the bandpass filter 40 and further tunable circuits provided in the arrangement, another desired frequency distance between the frequency of the high-frequency oscillator 11 and the stabilizing spectrum component of the pulses at the collecting electrode 27 may be maintained.

What is claimed is:

1. A device for obtaining angular modulation comprising a cathode-ray tube having an electron beam collecting electrode and deflection members for deflecting the electron beam, a governing voltage source coupled to said deflection members, means associated with said tube for producing electron beam pulses at said collecting electrode in a rhythm determined by the governing voltage of said source, a high-frequency oscillator coupled to said tube in a manner such that the electron beam of said cathode-ray tube is modulated in intensity by the voltage therefrom, a control-voltage circuit including an integrating network and a low bandpass filter for producing a control voltage from the amplitude modulated pulses occurring at the collecting electrode of said tube, said network coupling said electrode to said filter, a frequency corrector coupled to said high-frequency oscillator and controlled by said control voltage for automatic frequency stabilisation and phase stabilization of the oscillator voltage relative to a higher harmonic of the frequency of said governing voltage, a modulation voltage source connected in series with said governing voltage source across said deflection members, and means controlling said electron beam in accordance with said governing voltage in a manner such that said electron beam strikes said collecting electrode only once in one period of said governing voltage, said control voltage circuit being adapted to pass the modulation frequencies substantially uniformly.

2. A device, as set forth in claim 1, wherein the amplitude of the modulation voltage is at most one-fourth of the amplitude of the governing voltage.

3. A device, as set forth in claim 1, wherein said control voltage circuit includes a filter coupled to the collecting electrode and tuned to a low harmonic of the pulse recurrence-frequency, an amplifier, an amplitude detector and said low-pass filter, said amplifier coupling said low harmonic tuned filter to said detector, said low bandpass filter being coupled to said detector.

4. A device, as set forth in claim 1, in which there is a frequency difference between the frequency of the high-frequency oscillator and a harmonic of the governing-voltage frequency, this difference being equal to a medium frequency, is maintained wherein said control-voltage circuit includes a filter tuned to said medium frequency and having a bandwidth which corresponds preferably to double the frequency range of the modulation voltage, an auxiliary oscillator adapted to supply said medium frequency, a mixing stage operating as a phase detector and said low-pass filter, said mixing stage being coupled to the output of said medium frequency tuned filter and said auxiliary oscillator and to the input of said low-pass filter, said low-pass filter being adapted to pass direct voltages and the modulation frequencies.

References Cited in the file of this patent

UNITED STATES PATENTS

| Number | Name | Date |
|---|---|---|
| 2,495,738 | Labin et al. | Jan. 31, 1950 |
| 2,569,358 | Overbeck | Sept. 25, 1951 |
| 2,570,790 | Gray | Oct. 9, 1951 |
| 2,662,214 | Hugenholtz | Dec. 8, 1953 |